United States Patent
Noma

(10) Patent No.: US 10,896,026 B2
(45) Date of Patent: Jan. 19, 2021

(54) DATA CONVERSION METHOD AND DATA CONVERSION APPARATUS

(71) Applicant: FUJITSU LIMITED, Kawasaki (JP)

(72) Inventor: Yui Noma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 16/121,794

(22) Filed: Sep. 5, 2018

(65) Prior Publication Data

US 2019/0079735 A1 Mar. 14, 2019

(30) Foreign Application Priority Data

Sep. 8, 2017 (JP) .................. 2017-173099

(51) Int. Cl.
| | | |
|---|---|---|
| *G06F 8/30* | (2018.01) | |
| *G06N 5/02* | (2006.01) | |
| *G06N 99/00* | (2019.01) | |
| *G05B 19/042* | (2006.01) | |
| *G06N 20/00* | (2019.01) | |
| *G06F 16/00* | (2019.01) | |
| *G06F 16/25* | (2019.01) | |

(52) U.S. Cl.
CPC .......... *G06F 8/30* (2013.01); *G05B 19/0423* (2013.01); *G06F 16/00* (2019.01); *G06F 16/254* (2019.01); *G06F 16/258* (2019.01); *G06N 5/025* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,787,487 A * | 7/1998 | Hashimoto | G06F 12/08 710/68 |
| 8,036,908 B2 * | 10/2011 | Schwarzmann | G06Q 10/103 705/1.1 |
| 2006/0010175 A1 * | 1/2006 | Kwong | G06F 8/71 |
| 2006/0080115 A1 * | 4/2006 | Schwarzmann | G06Q 10/06 717/105 |
| 2010/0138810 A1 * | 6/2010 | Komatsu | G06F 8/30 717/107 |
| 2016/0299744 A1 | 10/2016 | Kalai et al. | |
| 2017/0075661 A1 | 3/2017 | Gulwani et al. | |

(Continued)

OTHER PUBLICATIONS

Zhongjun, Jin et al., "Foofah: Transforming Data by Example", SIGMOD 2017 (16 pages).

(Continued)

*Primary Examiner* — Umut Onat
(74) *Attorney, Agent, or Firm* — Fujitsu Patent Center

(57) ABSTRACT

A data conversion apparatus includes a memory and a processor coupled to the memory. The processor is configured to acquire first data. The processor is configured to acquire a part of second data corresponding to a part of the first data. The processor is configured to search for a combination of processes based on an attribute indicating a processing time for performing each process among processes for converting the part of the first data into the part of the second data. The combination of processes is used for converting a remainder of the first data into a remainder of the second data. The processor is configured to output the combination of processes.

8 Claims, 18 Drawing Sheets

(56) References Cited

U.S. PATENT DOCUMENTS

2017/0161027 A1   6/2017  Singh

OTHER PUBLICATIONS

Abedjan, Z. et al., "DataXFormer: A Robust Transformation Discovery System", ICDE 2016 (12 pages).
Dijkstra, E. W., "A Note on Two Problems in Connexion with Graphs", Numerische Mathematik 1: 269-271, 1959 (3 pages).
Hart, P. E. et al., "A Formal Basis for the Heuristic Determination of Minimum Cost Paths", IEEE Transactions on Systems Science and Cybernetics SSC4. 4(2)100-107, 1968 (8 pages).

\* cited by examiner

FIG. 3

| PROCESS TYPE | ATTRIBUTE (1: HEAVY, 0: LIGHT) | AVERAGE PROCESSING TIME |
|---|---|---|
| DIVISION | 0 | 0.1 ms |
| EXTERNAL DATA REFERENCE | 1 | 5.5 ms |
| REPLACEMENT | 0 | 0.5 ms |
| COLUMN COPY | 0 | 0.3 ms |
| COLUMN DELETION | 0 | 0.2 ms |
| . . . | . . . | . . . |

FIG. 4

| PROCESS NUMBER | PROCESS TYPE | PARAMETER |
|---|---|---|
| 1 | DIVISION | {colIdx: 1, delimiter: ','} |
| 2 | EXTERNAL DATA REFERENCE | {join_colIdx0: 0, table_name: master01, join_colIdx1: 4} |
| 3 | REPLACEMENT | {colIdx: 5, regex: '/[\w ]+/', str1: 'abc'} |
| 4 | COLUMN COPY | {colIdx: 4} |
| 5 | COLUMN DELETION | {colIdx: 7} |
| ... | ... | |

FIG. 7

CONVERSION LOGIC

| f3(f2(f1(data, param1), param2), param3) |

PRE-CONVERSION DATA

| TELEPHONE NUMBER |
| --- |
| Tel:(111)111-1111 |
| (222)222-2222 |
| Tel:333-333-3333 |
| 444-444-4444 |
| Tel:(555)555-5555 |
| (666)666-6666 |
| Tel:(777)777-7777 |
| . . . |

POST-CONVERSION DATA

| TELEPHONE NUMBER |
| --- |
| 111-111-1111 |
| 222-222-2222 |
| 333-333-3333 |
| 444-444-4444 |
| 555-555-5555 |
| 666-666-6666 |
| 777-777-7777 |
| . . . |

POST-CONVERSION DATA ACQUIRED AS A RESULT OF CONVERSION

DATA CONVERSION METHOD AND DATA CONVERSION APPARATUS

CROSS-REFERENCE TO RELATED APPLICATION

This application is based upon and claims the benefit of priority of the prior Japanese Patent Application No. 2017-173099, filed on Sep. 8, 2017, the entire contents of which are incorporated herein by reference.

FIELD

The embodiment discussed herein is related to a data conversion method and a data conversion apparatus.

BACKGROUND

When a company examines a sales strategy, data analysis is performed on a purchase history and the like. For example, a company having many branch departments and branch offices may analyze what products are sold for each region and customer, and devise a sales strategy. However, file formats and data expressions of data of the purchase history and the like used for the analysis may differ depending on the sales base or purchasing department of the company, so that the data of the purchase history are unified in the file format and data expression. When sales trends are analyzed in combination with public data such as weather data, the data in the company and the public data are also unified in the file format and data expression.

Related techniques include a system that efficiently searches a space of data transformation operations to generate a program that will perform a desired transformation.

Related techniques include a system that discovers transformations. The system utilizes a Web table to discover transformations of multiple columns, transformations that are not functions, indirect transformations, and the like.

Related techniques include the Dijkstra's algorithm for finding a path of minimum total length between two given nodes on a graph.

Related techniques include the A* algorithm, which is a graph search algorithm using a heuristic function that returns an estimate of the distance from each node to the goal.

Related techniques are disclosed in, for example, U.S. Patent Application Publication No. 2016/0299744, U.S. Patent Application Publication No. 2017/0075661, and U.S. Patent Application Publication No. 2017/0161027.

Related techniques are disclosed in, for example, Zhongjun Jin et. al., "Foofah: Transforming Data By Example", SIGMOD'17; Z. Abedjan, et. al. "DataXFormer: A Robust Transformation Discovery System", ICDE 2016; Dijkstra, E. W. "A note on two problems in connexion with graphs", Numerische Mathematik 1: 269-271, 1959; and Hart, P. E., Nilsson, N. J., Raphael, B. "A Formal Basis for the Heuristic Determination of Minimum Cost Paths", IEEE Transactions on Systems Science and Cybernetics SSC4. 4 (2): 100-107, 1968.

When post-conversion data is generated by applying a plurality of processes to pre-conversion data, it is preferable to shorten the time of searching for the processes to be performed.

For example, when information that does not included in the pre-conversion data is used for data conversion, data (external data) other than the pre-conversion data may be used in some cases. A process that refers to external data takes longer processing time than a process that does not refer to external data. Therefore, as the number of processes that refer to external data increases, the time of searching for the processes used in the data conversion increases.

SUMMARY

According to an aspect of the present invention, provide is a data conversion apparatus including a memory and a processor coupled to the memory. The processor is configured to acquire first data. The processor is configured to acquire a part of second data corresponding to a part of the first data. The processor is configured to search for a combination of processes based on an attribute indicating a processing time for performing each process among processes for converting the part of the first data into the part of the second data. The combination of processes is used for converting a remainder of the first data into a remainder of the second data. The processor is configured to output the combination of processes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a process type table;

FIG. 4 is a diagram illustrating an example of a combination of processes;

FIG. 7 is a diagram illustrating an example of display of a result of conversion;

DESCRIPTION OF EMBODIMENT

Figure 1:
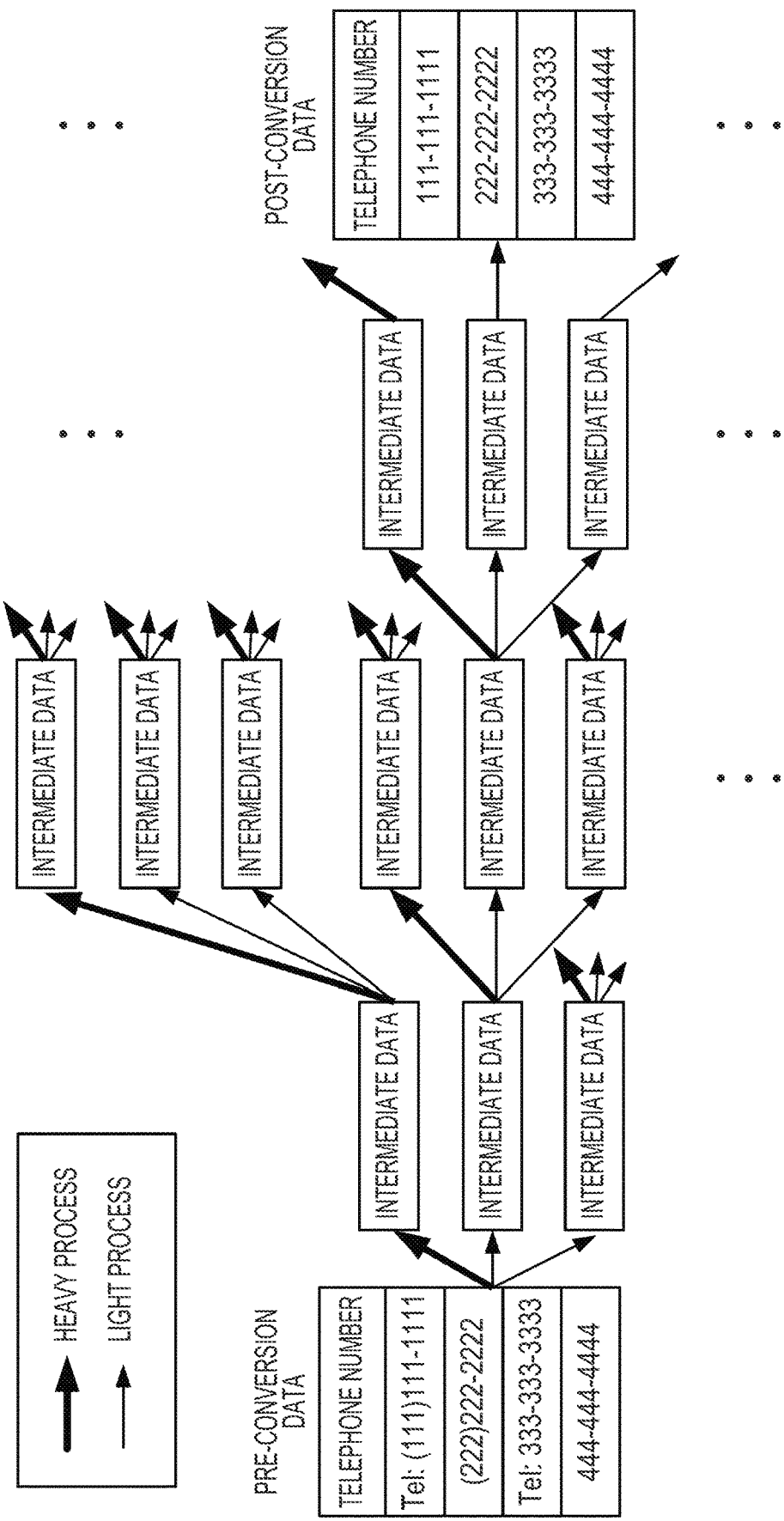
FIG. 1 is a diagram illustrating a comparative example of a data conversion process.

Hereinafter, an embodiment will be described with reference to the drawings. FIG. 1 illustrates a comparative example of a data conversion process. As illustrated in FIG.

1, an information processing apparatus performing the processes of the comparative example generates post-conversion data by performing a plurality of processes on pre-conversion data. Intermediate data is data generated in the course of converting the pre-conversion data into the post-conversion data, and generated by applying at least one process to the pre-conversion data.

The pre-conversion data illustrated in FIG. 1 is a telephone number and includes symbols such as "Tel:", "(", and")". The post-conversion data is a telephone number with the format "XXX-XXX-XXXX". The arrows illustrated in FIG. 1 indicate processes. A thick arrow indicates a heavy process, and a thin arrow indicates a light process. A heavy process is, for example, a process which takes a predetermined time or more. A light process is, for example, a process which takes a time less than the predetermined time. A heavy process is, for example, a process in which external data is referred.

As illustrated in FIG. 1, when a plurality of processes are performed on the pre-conversion data to generate the post-conversion data, many combinations of processes may be performed. In particular, when a heavy process is included in the combination of processes, the time taken for searching for the combination of processes is prolonged.

Figure 2:
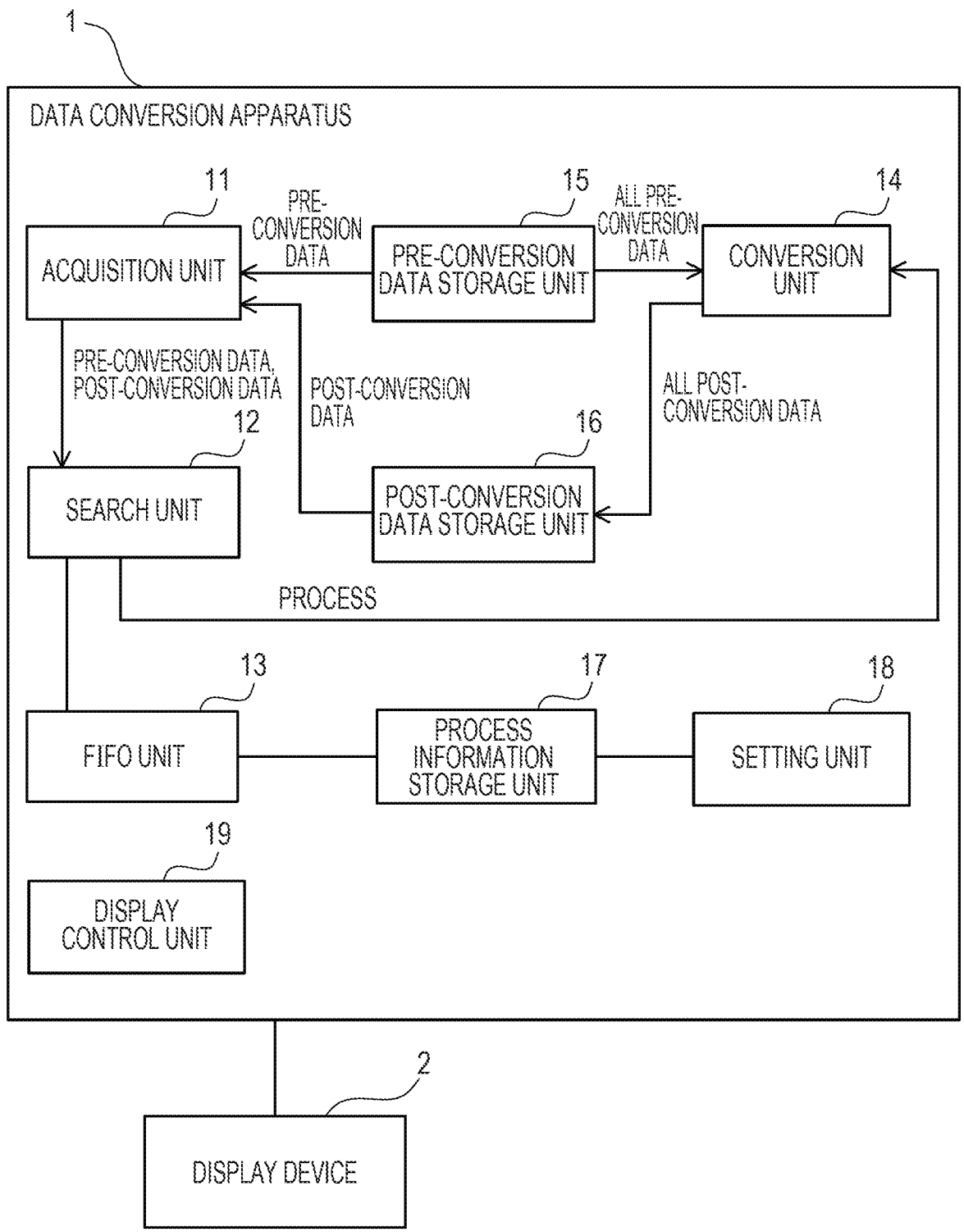
FIG. 2 is a diagram illustrating an example of a data conversion system.

FIG. 2 is a diagram illustrating an example of a data conversion system. The data conversion system includes a data conversion apparatus 1 and a display device 2. The data conversion apparatus 1 includes an acquisition unit 11, a search unit 12, an FIFO unit 13, a conversion unit 14, a pre-conversion data storage unit 15, a post-conversion data storage unit 16, a process information storage unit 17, a setting unit 18, and a display control unit 19. The data conversion apparatus 1 is an example of a computer.

Note that the conversion unit 14, the pre-conversion data storage unit 15, the post-conversion data storage unit 16, and the process information storage unit 17 may be included in an apparatus different from the data conversion apparatus 1.

The acquisition unit 11 acquires pre-conversion data stored in the pre-conversion data storage unit 15. The acquisition unit 11 also acquires post-conversion data stored in the post-conversion data storage unit 16. The post-conversion data is data converted from the pre-conversion data. The pre-conversion data acquired by the acquisition unit 11 may be part of the pre-conversion data stored in the pre-conversion data storage unit 15. The post-conversion data acquired by the acquisition unit 11 corresponds to the acquired pre-conversion data, and is stored in advance by a user's input operation on the data conversion apparatus 1. The pre-conversion data is an example of first data. The post-conversion data is an example of second data.

The search unit 12 searches for a combination of a plurality of processes to be used for converting the pre-conversion data to the post-conversion data based on the attribute indicating the processing time defined for each process. For the search, the search unit 12 uses the pre-conversion data and the post-conversion data acquired by the acquisition unit 11.

The FIFO unit 13 performs an FIFO process using a queue in which numerical values indicating the attributes are stored in order of processing.

The conversion unit 14 converts conversion target data based on a combination of a plurality of processes. The conversion target data is, for example, all of the data stored in the pre-conversion data storage unit 15.

The pre-conversion data storage unit 15 stores therein the pre-conversion data. The post-conversion data storage unit 16 stores therein the post-conversion data. Part of the post-conversion data is input in advance by the user. The remaining post-conversion data is acquired by the conversion performed by the conversion unit 14.

The process information storage unit 17 stores therein a process type table to be described later. The setting unit 18 sets an attribute for each process in the process type table. The process information storage unit 17 also stores a combination of processes found by the search unit 12.

The display control unit 19 displays the found combination of the plurality of processes on the display device 2. The display control unit 19 also displays the post-conversion data converted from the pre-conversion data by the conversion unit 14.

FIG. 3 is a diagram illustrating an example of the process type table. As illustrated in FIG. 3, in the process type table, each process is associated with an attribute indicating whether the process is a heavy process or a light process. In the example illustrated in FIG. 3, "1" corresponds to heavy process, and "0" corresponds to light process. For example, a division process is a process of dividing a character string of pre-conversion data at a position where "," or ":" is present. The division process may be performed in a relatively short time, so that the division process is classified as a light process.

In the example illustrated in FIG. 3, only "external data reference" is associated with a heavy process. However, another process may be associated with a heavy process. For example, a transposition process of switching rows and columns of a table may be associated with a heavy process. The attribute for each process type illustrated in FIG. 3 is defined in advance, for example, by the user.

The external data is used, for example, when the post-conversion data is not included in the pre-conversion data or the intermediate data. For example, external data indicating that "Ltd." is an abbreviation of "Limited" is used when converting "ABCLtd." to "ABCLimited". The external data is data other than the pre-conversion data, the intermediate data, and the post-conversion data, and may be stored in the data conversion apparatus 1 or may be acquired from another information processing apparatus.

The setting unit 18 may set "1" or "0" to the process type table by performing a process on a start node (pre-conversion data), measuring the processing time, and determining whether the process is a heavy process or a light process based on the processing time. For example, the setting unit 18 may measure the processing time of a process of each process type, and calculate the average value $\mu$ and the standard deviation $\sigma$ of the processing times for all process types. When the processing time of a process of a certain process type is, for example, $\mu+2\sigma$ or more, the setting unit 18 determines that a process of this process type is a heavy process and sets "1" as the attribute. When the processing time of a process of a certain process type is, for example, less than $\mu+2\sigma$, the setting unit 18 determines that a process of this process type is a light process and sets "0" as the attribute.

The setting unit 18 may inquire the user whether each process is a heavy process or a light process. For example, the display control unit 19 displays the process type table illustrated in FIG. 3 on the display device 2 and a message prompting the user to select whether each process is a heavy process or a light process. Then, the setting unit 18 may set the attribute based on the input of the user.

The setting unit 18 may measure the processing time of each processes, and calculate and record the average value (average processing time) of the processing time for each process type. Then, as illustrated in FIG. 3, the display control unit 19 may display the average processing time for each process type. The display control unit 19 may display the process type in descending order of the average processing time. Then, the setting unit 18 may set the attribute based on the input of the user.

FIG. 4 is a diagram illustrating an example of a combination of processes. The combination of processes illustrated in FIG. 4 includes a process number, a process type, and a parameter. The process number indicates the order in which the process is performed during conversion. The parameter is expressed in, for example, a format of JavaScript (registered trademark) Object Notation (JSON). The conversion logic is kept as a sequence of processes and held using any serialization function.

After performing the search process, the search unit 12 sends the combination of processes to the conversion unit 14, and stores the combination of processes in the process information storage unit 17, for example, in the format illustrated in FIG. 4.

Figure 5:
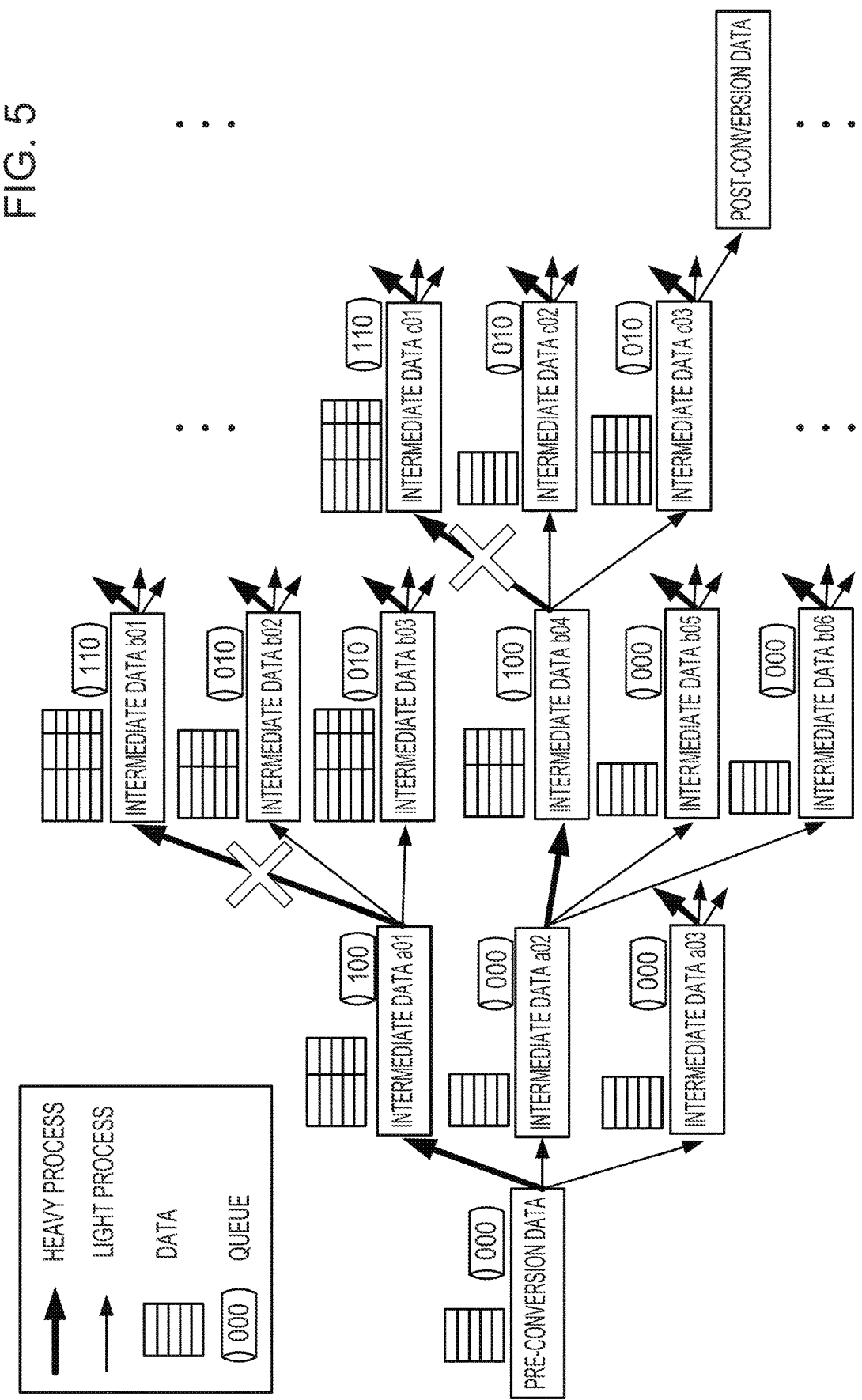
FIG. 5 is a diagram illustrating a procedure of a data conversion process.

FIG. 5 is a diagram illustrating a procedure of a data conversion process. The data conversion apparatus 1 performs a plurality of processes on the pre-conversion data to output the post-conversion data. The intermediate data is data generated in the course of the conversion. As illustrated in FIG. 5, data represented in a table format and a queue used in the FIFO process are illustrated above the pre-conversion data and the intermediate data.

For example, the search unit 12 acquires a pair of pre-conversion data and post-conversion data and searches for a combination of processes to be used to convert the pre-conversion data into the post-conversion data. The search unit 12 inserts "1" in the FIFO queue when the process is a heavy process. The search unit 12 inserts "0" in the FIFO queue when the process is a light process.

It is assumed that the heavy process illustrated in FIG. 5 is an external data reference process. When performing the external data reference process, because the external data is added to the data, the number of columns in the table increases.

When searching for processes, the search unit 12 treats a heavy process as a candidate process in a case where "1" indicating a heavy process is not included in the FIFO queue and where the data for the search does not include the post-conversion data. That is, the search according to the embodiment is different from the comparative example illustrated in FIG. 1 in that a heavy process may be excluded from candidate processes.

In the example illustrated in FIG. 5, the heavy process for converting the intermediate data a01 into the intermediate data b01 and the heavy process for converting the intermediate data b04 into the intermediate data c01 are excluded from the candidate processes.

The data conversion apparatus 1 according to the embodiment treats a heavy process as a candidate process when a predetermined condition is satisfied. When the predetermined condition is not satisfied, the data conversion apparatus 1 excludes the heavy process from candidate processes. Thus, the time of searching for the processes may be reduced.

Figure 6:
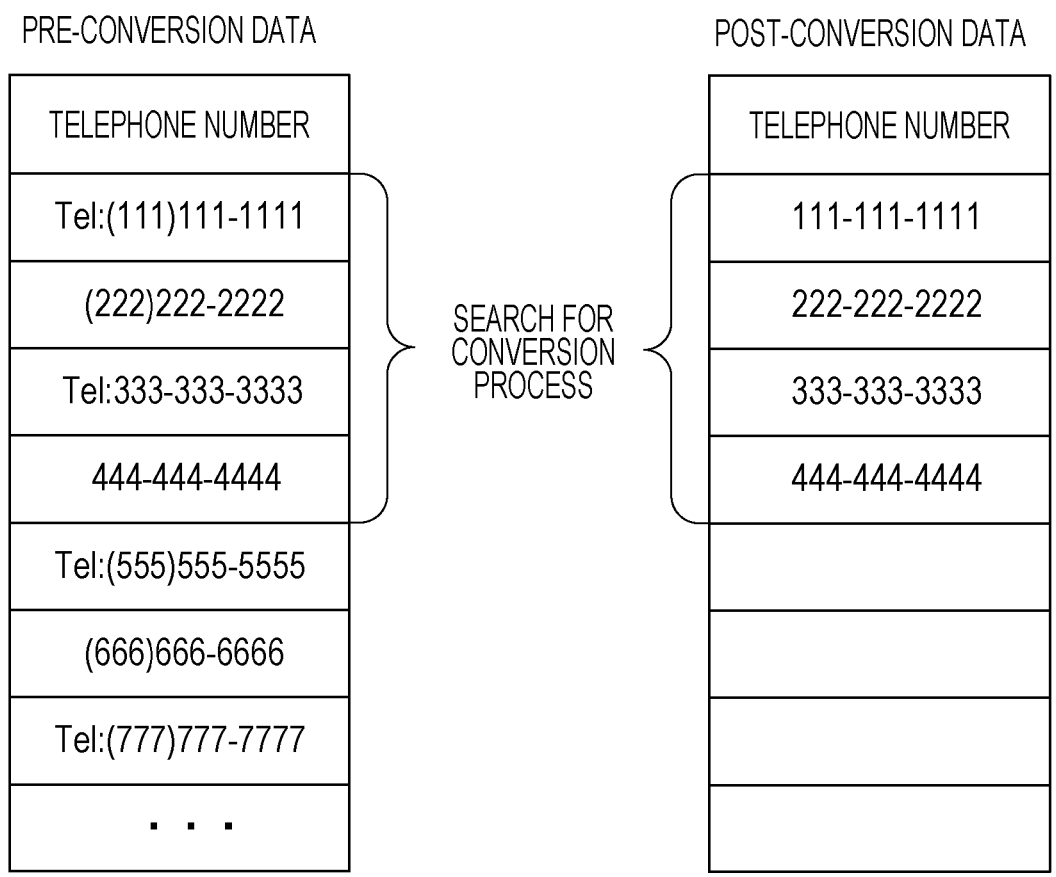
FIG. 6 is a diagram illustrating an example of display before conversion.

FIG. 6 is a diagram illustrating an example of display before conversion. In the example illustrated in FIG. 6, the pre-conversion data and the post-conversion data are telephone numbers. The pre-conversion data is telephone numbers including symbols such as "Tel:", "(",")". The post-conversion data is telephone numbers indicated in the format "XXX-XXX-XXXX".

For example, the display control unit 19 displays all the pre-conversion data and a message prompting the user to input a certain number of post-conversion data. It is assumed that four telephone numbers are input as post-conversion data by the user.

In the example illustrated in FIG. 6, the acquisition unit 11 acquires four telephone numbers of pre-conversion data and four telephone numbers of post-conversion data corresponding to the pre-conversion data. Then, the search unit 12 searches for a combination of processes to be used for the conversion based on the acquired pre-conversion data and the post-conversion data.

FIG. 7 is a diagram illustrating an example of display of the result of conversion. The search unit 12 outputs a conversion logic used for conversion based on the acquired pre-conversion data and post-conversion data. The display control unit 19 displays the conversion logic output from the search unit 12 on the display device 2.

As illustrated in FIG. 7, the conversion logic is a combination of a plurality of processes (functions). The conversion logic illustrated in FIG. 7 is a combination of processes f1, f2, and f3.

The display control unit 19 also displays the post-conversion data converted from the pre-conversion data by the conversion unit 14. In the example illustrated in FIG. 7, the display control unit 19 displays all the post-conversion data corresponding to the pre-conversion data.

Note that the pre-conversion data or the intermediate data may include a numerical value, a date, and the like, in addition to a character string. The data conversion apparatus 1 according to the present embodiment transforms all types of data into character strings and then performs the conversion.

FIGS. 8A to 8D are flowcharts illustrating an example of processes according to the embodiment. In the embodiment, search is performed using the A* algorithm as a graph search algorithm with the pre-conversion data as the start node and the post-conversion data as the goal node. Other search algorithms may be applied to the search.

The acquisition unit 11 acquires pre-conversion data start, post-conversion data end, a heuristic function h, and a neighboring node output function neighborFunc (S101).

The search unit 12 inserts M "0"s into an empty queue F used as an FIFO queue (S102). The search unit 12 empties a set openSet, inserts a pair (start, F) into openSet and empties a set closedSet (S103). OpenSet stores a node under calculation. ClosedSet stores a node after calculation.

The search unit 12 empties an associative array cameFrom and an associative array cameFromWithOp (S104). The associative array cameFrom stores nodes (data) on a path from the start node to the goal node. The associative array cameFromWithOp stores candidate processes to be performed until reaching the goal node from the start node.

The search unit 12 empties an associative array gScore and an associative array fScore and sets "0" to gScore[(start, F)] (S105). The search unit 12 sets h(start, end) to fScore[(start, F)] using the heuristic function h (S106).

The heuristic function h is a function that returns an estimated value of the minimum cost between nodes. For example, h(start, end) returns an estimated value of the minimum cost from start to end. For example, "Algorithm 4: Table Edit Distance Algorithm" disclosed in Zhongjun Jin et. al., "Foofah: Transforming Data By Example", SIGMOD'17 may be applied to the heuristic function h.

The search unit 12 determines whether openSet is empty (S107). When it is determined that openSet is empty ("YES" in S107), a Boolean value "False", which is a failure flag, is output (S111), and the process ends. The display control unit 19 may display, on the display device 2, a message to the effect that the search process has failed.

When it is determined that openSet is not empty ("NO" in S107), the search unit 12 searches openSet for a pair (node, F) having the smallest fScore value, sets the node to data current_node, sets F to a queue current_F (S108).

The search unit 12 determines whether current_node is the same as end (S109). When "YES" is determined in S109, it means that the search has been performed up to the goal node, so that the search unit 12 stores cameFrom, cameFromWithOp, and current_F in the process information storage unit 17 (S110).

When "NO" is determined in S109, the process proceeds to S112. The search unit 12 removes (current_node, current_F) from openSet and adds (current_node, current_F) to closedSet (S112). The search unit 12 calculates neighborFunc(current_node, current_F, end) to obtain, as outputs, a pair list NL and a process list operatorList (S113). Details of S113 will be described later.

The search unit 12 determines whether NL is empty (S114). When it is determined that NL is empty ("YES" in S114), the process proceeds to S107.

When it is determined that NL is not empty ("NO" in S114), the search unit 12 sets a pair extracted from NL to (neighbor_node, neighbor_F) and sets a process extracted from operatorList to oi (S115).

The search unit 12 determines whether (neighbor_node, neighbor_F) exists in closedSet (S116). When "YES" is determined in S116, the process returns to S114.

When "NO" is determined in S116, the process proceeds to S117. The search unit 12 determines whether (neighbor_node, neighbor_F) exists in openSet (S117). When "NO" is determined in S117, the search unit 12 adds (neighbor_node, neighbor_F) to openSet (S118).

When "YES" is determined in S117 or after the processing of S118, the search unit 12 sets gScore[(current_node, current_F)]+dist_between(current_node, neighbor_node) to a scalar value tentative_gScore (S119). The dist_between function will be described later in detail.

The search unit 12 determines whether gScore[(neighbor_node, neighbor_F)] is equal to or less than tentative_gScore (S120). When "YES" is determined in S120, the process returns to S114.

When "NO" is determined in S120, the search unit 12 sets (current_node, current_F) to cameFrom[(neighbor_node, neighbor_F)] (S121). That is, the processing of S121 indicates that (neighbor_node, neighbor_F) is acquired as a result of applying a process to (current_node, current_F).

The search unit 12 sets oi to cameFromWithOp[(neighbor_node, neighbor_F)] (S122). Note that cameFromWithOp[(neighbor_node, neighbor_F)] indicates the process applied when the (neighbor_node, neighbor_F) is acquired. In other words, S122 indicates that (neighbor_node, neighbor_F) is acquired as a result of the process oi is applied on a pair of node and queue.

The search unit 12 sets tentative_gScore to gScore[(neighbor_node, neighbor_F)] (S123).

The search unit 12 sets gScore[(neighbor_node, neighbor_F)]+h(neighbor_node, end) to fScore[(neighbor_node, neighbor_F)] (S124). After S124, the process proceeds to S114.

Figure 8A:
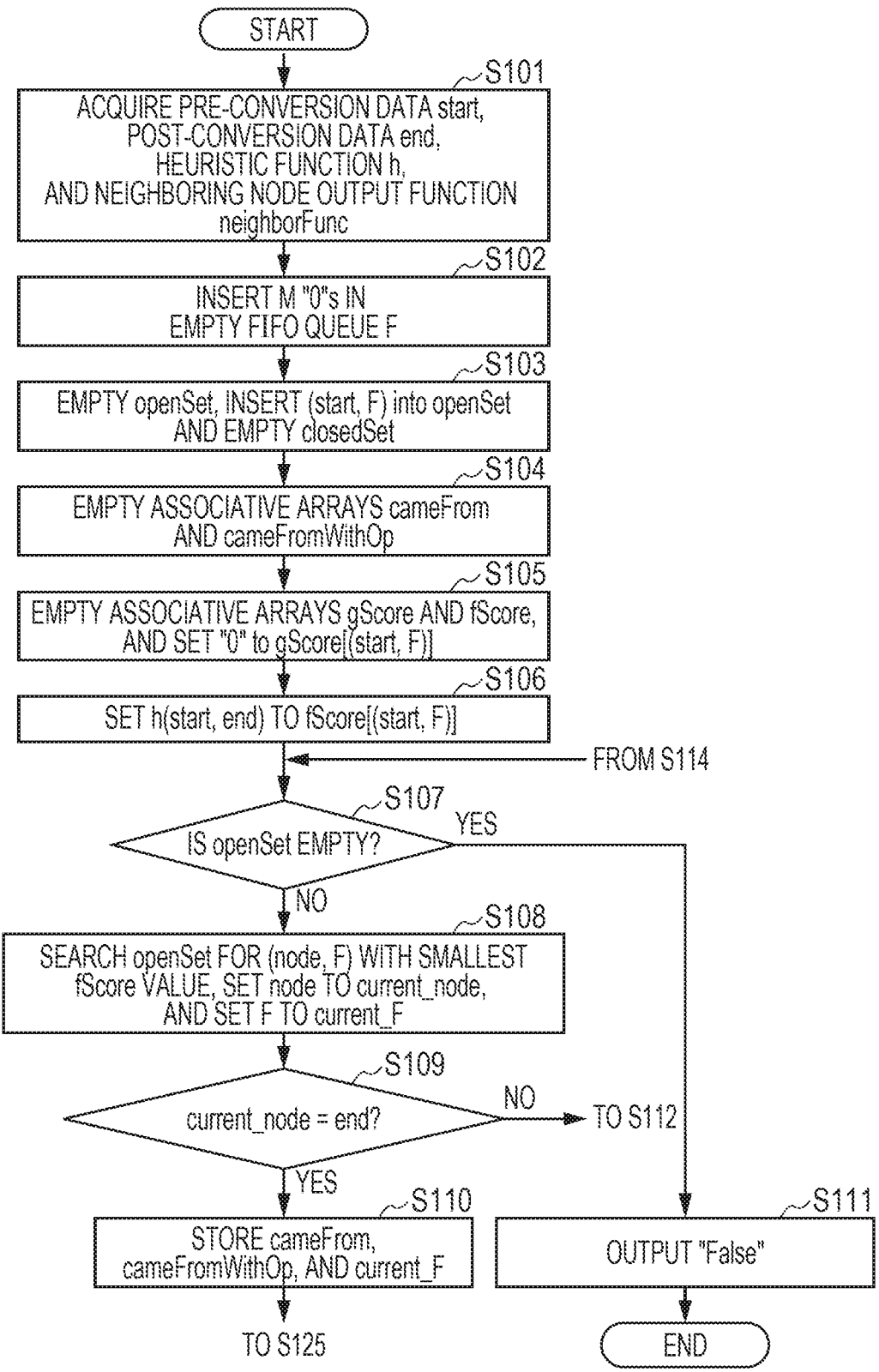
FIGS. 8A to 8D are flowcharts illustrating an example of processes according to an embodiment.
Figure 8B:
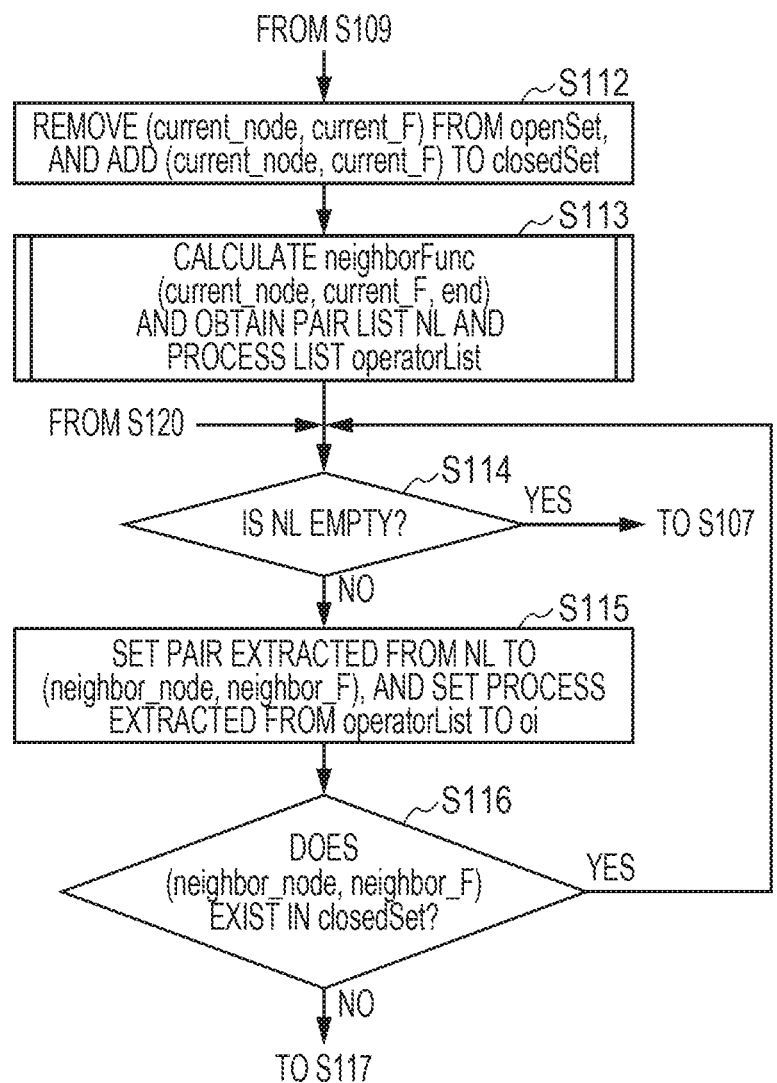
Figure 8C:
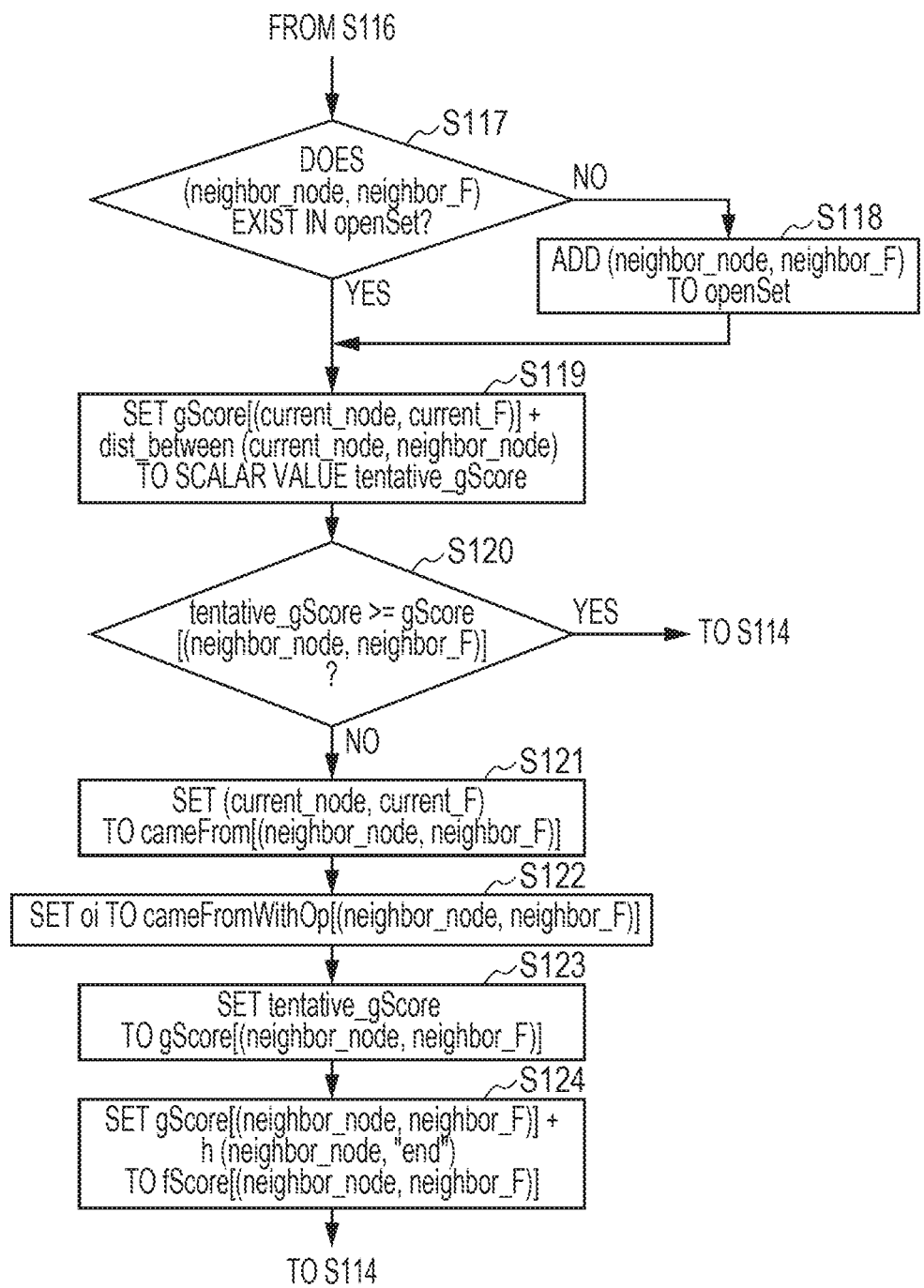
Figure 8D:
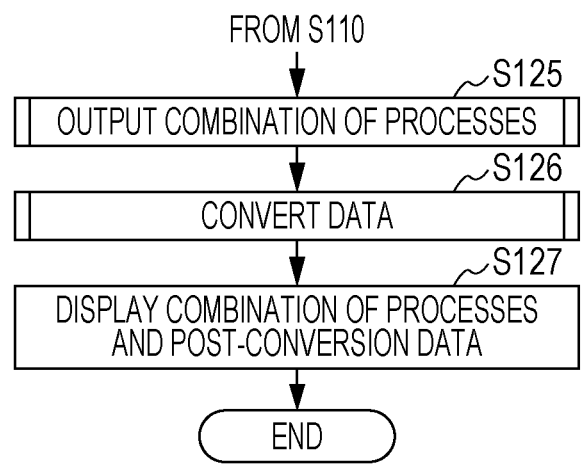

After S110 of FIG. 8A, the process proceeds to S125 of FIG. 8D. The search unit 12 outputs a combination of processes to be used for conversion of the conversion target data d based on cameFrom, cameFromWithOp, and current_F (S125). Details of S125 will be described later.

The conversion unit 14 converts the conversion target data d by using the combination of processes to be used for conversion of the conversion target data d (S126).

The display control unit 19 displays, on the display device 2, the post-conversion data and the combination of processes (conversion logic) used for the conversion of the conversion target data d (S127). The display control unit 19 display the conversion logic and the post-conversion data on the display device 2, for example, in the format illustrated in FIG. 7.

Figure 9:
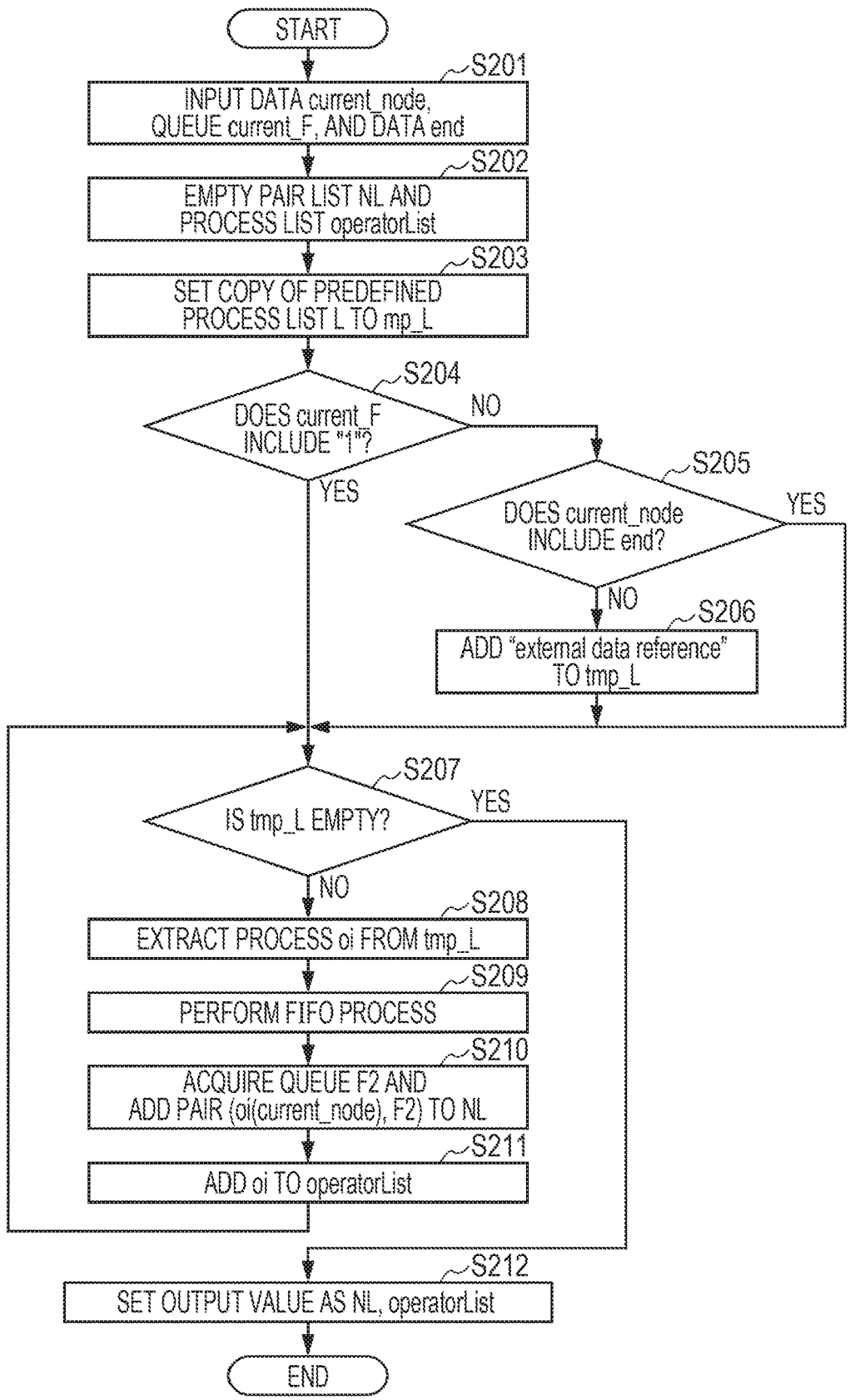
FIG. 9 is a flowchart illustrating a first exemplary process of a neighborFunc function in S113 of FIG. 8B.

FIG. 9 illustrates a first exemplary process of neighborFunc function used in S113 of FIG. 8B. NeighborFunc function is a function called in S113 of FIG. 8B and is implemented by the search unit 12.

The search unit 12 inputs the data current_node, the queue current_F, and the data end to neighborFunc function (S201). The search unit 12 empties the pair list NL and the process list operatorList (S202). The search unit 12 sets a copy of a predefined processing list L to tmp_L (S203).

The search unit 12 determines whether "1" is included in current_F (S204). When "1" is included in current_F, it means that a heavy process is included in a predetermined number (a first number) of processes performed immediately before the process applied to the node (current_node) to be searched for. The predetermined number is equal to the number of numerical values stored in the queue.

When "NO" is determined in S204, it is determined whether current_node includes an element end (S205). When "NO" is determined in S205, the search unit 12 adds "external data reference" to tmp_L (S206). Note that, when a heavy process other than "external data reference" exists in the process type table illustrated in FIG. 3, the search unit 12 also adds the heavy process other than "external data reference" to tmp_L in S206.

That is, when no heavy process is included in a predetermined number of processes performed immediately before the previously found process and when the post-conversion data is not included in search target data, the search unit 12 treats a heavy process as a candidate of a process to be applied to the search target data.

The search unit 12 determines whether tmp_L is empty (S207). When it is determined that tmp_L is not empty ("NO" in S207), the search unit 12 extracts any process oi out of tmp_L (S208). The search unit 12 sends the process oi and the queue F to the FIFO unit 13. Then, the FIFO unit 13 performs the FIFO process (S209). As a result of the FIFO process, the FIFO unit 13 outputs an updated queue F2. Details of the FIFO process in S209 will be described later.

The search unit 12 acquires the queue F2 updated in the FIFO process, and adds a pair (oi(current_node), F2) to NL (S210). The search unit 12 adds oi to operatorList (S211). After S211, the process proceeds to S207.

When it is determined that tmp_L is empty ("YES" in S207), the search unit 12 sets the output value of neighborFunc function as NL, operatorList (S212).

The process oi is performed in S210 of FIG. 9. When the process oi is a heavy process, the time of the search process increases. The data conversion apparatus 1 may speed up the search process because the external data reference process (heavy process) is not applied when it is determined, in S204 to S206, that the predetermined condition is not satisfied. In a case of employing the example illustrated in FIG. 9, the number of the execution intervals of a heavy process may be set to a predetermined number or more by the condition of S204.

Figure 10:
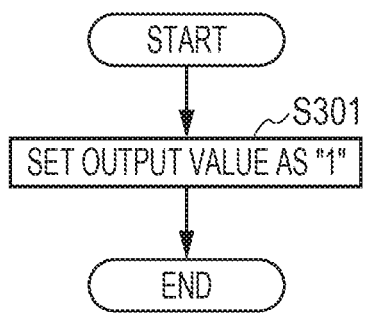
FIG. 10 is a flowchart illustrating an exemplary process of a dist_between function.

FIG. 10 is a flowchart illustrating an example of a dist_between function. The dist_between function is a function called in S119 of FIG. 8C. The dist_between function is implemented by the search unit 12.

The search unit 12 sets the output value of the dist_between function as "1" (S301). The output value of the dist_between function indicates the distance (cost) between the two input nodes. Note that although the output value of the dist_between function is "1" in the present embodiment, the output value may be a different value depending on the input nodes.

Figure 11:
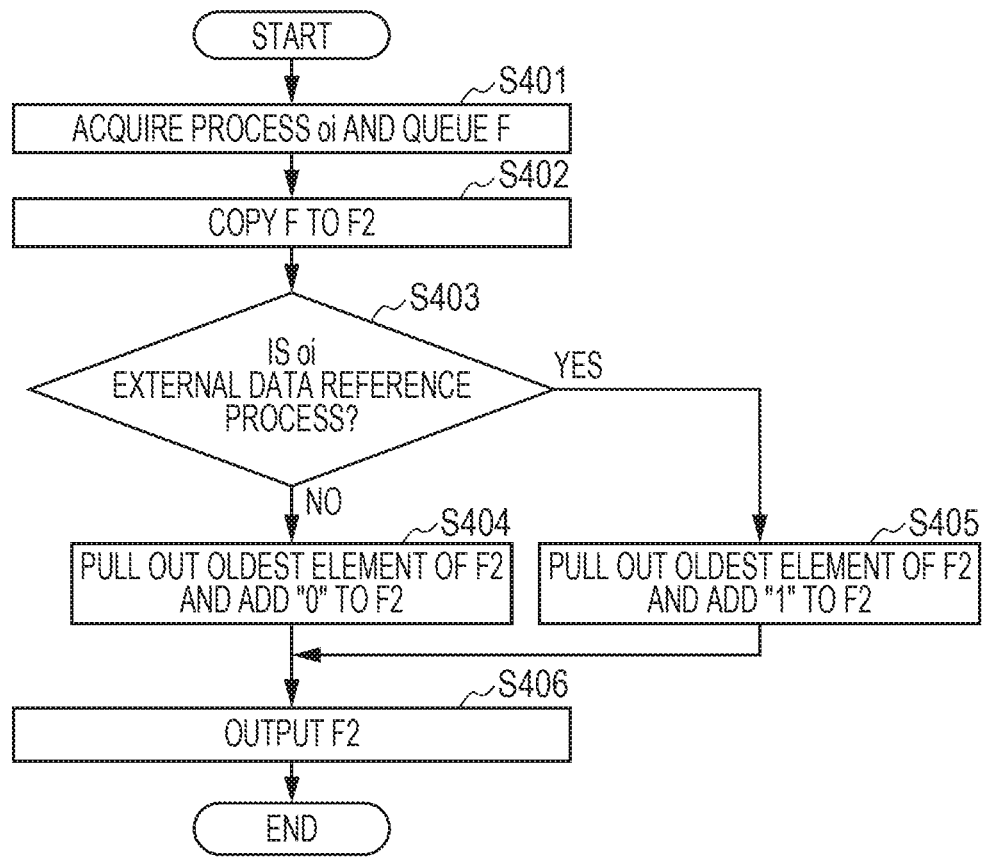
FIG. 11 is a flowchart illustrating a first example of an FIFO process in S209 of FIG. 9.

FIG. 11 is a flowchart illustrating a first example of the FIFO process in S209 of FIG. 9. The FIFO unit 13 acquires the process oi and the FIFO queue F (S401). The FIFO unit 13 sets a copy of F to F2 (S402).

The FIFO unit 13 determines whether oi is an external data reference process (S403). Note that another heavy process may exist in addition to the external data reference process. Therefore, in S403, the FIFO unit 13 may determine whether oi is a heavy process, for example, by referring to the process type table illustrated in FIG. 3.

When it is determined that oi is not an external data reference process ("NO" in S403), the FIFO unit 13 pulls out the oldest element of F2 and adds "0" to F2 (S404). When it is determined that oi is an external data reference process ("YES" in S403), the FIFO unit 13 pulls out the oldest element of F2 and adds "1" to F2 (S405).

The FIFO unit 13 outputs the updated F2 to the search unit 12 (S406).

Figure 12:
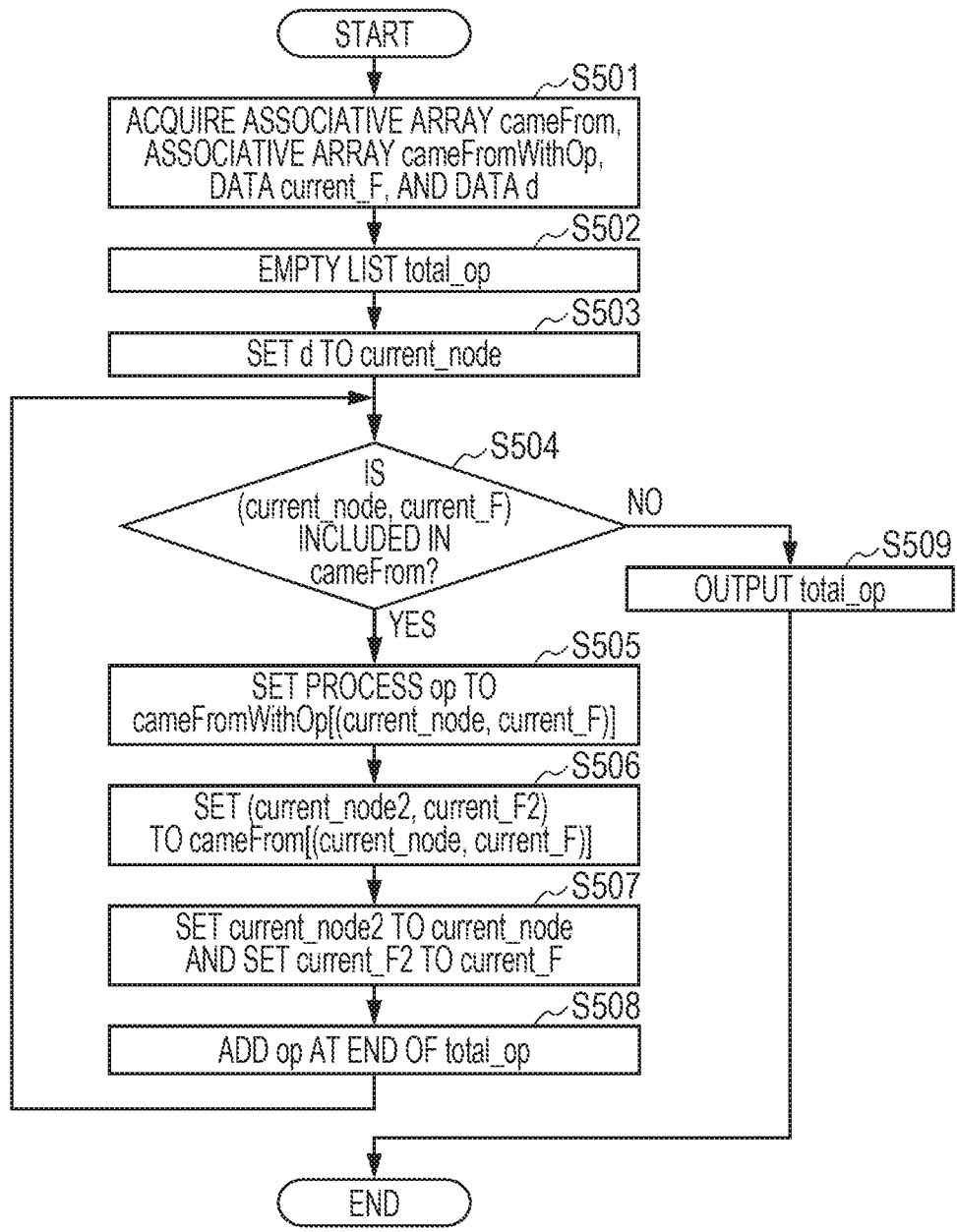
FIG. 12 is a flowchart illustrating an example of a process in S125 of FIG. 8D.

FIG. 12 is a flowchart illustrating an example of S125 of FIG. 8D. The search unit 12 acquires the associative array cameFrom and the associative array cameFromWithOp stored in the process information storage unit 17, and acquires the post-conversion data d from the post-conversion data storage unit 16 (S501). The search unit 12 empties a list total_op.

The search unit 12 sets d to current_node (S503). The search unit 12 determines whether (current_node, current_F) is included in cameFrom (S504).

When "YES" is determined in S504, a process op is set to cameFromWithOp[(current_node, current_F)] (S505). The search unit 12 sets (current_node2, current_F2) to cameFrom[(current_node, current_F)] (S506). The search unit 12 sets current_node2 to current_node and sets current_F2 to current_F (S507). The search unit 12 adds op to the end of total_op (S508).

When "NO" is determined in S504, search unit 12 outputs total_op to the conversion unit 14 (S509).

Through the above processing, the search unit 12 generates total_op indicating a combination of processes (conversion logic) by tracing the path in the reverse direction from the post-conversion data d to the pre-conversion data, and outputs total_op to the conversion unit 14. The processes are stored in total_op in a reverse order to the execution order of the conversion processes.

Figure 13:
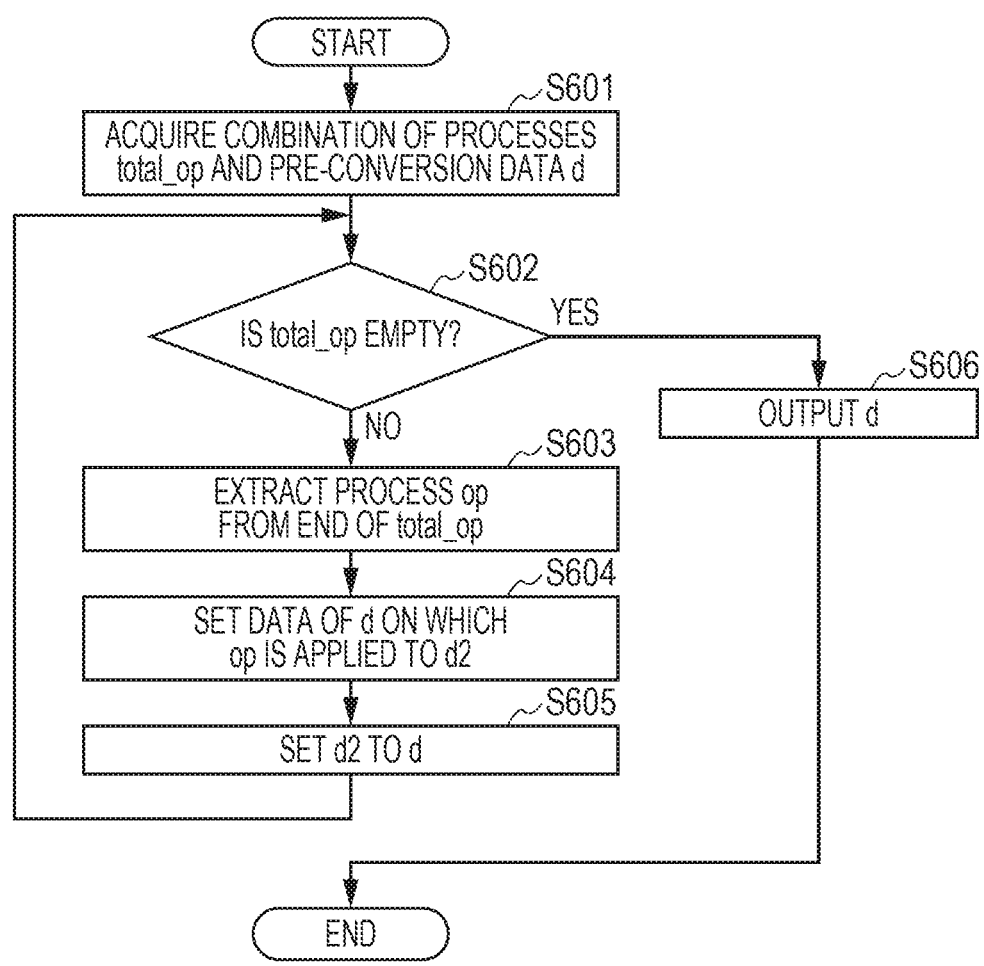
FIG. 13 is a flowchart illustrating an example of a process in S126 of FIG. 8D.

FIG. 13 is a flowchart illustrating an example of S126 of FIG. 8D. The conversion unit 14 acquires the processing list total_op from the search unit 12 and acquires the pre-conversion data d from the pre-conversion data storage unit 15 (S601). The conversion unit 14 determines whether total_op is empty (S602).

When it is determined that total_op is not empty ("NO" in S602), the conversion unit 14 extracts a process op from the end of total_op (S603). In S603, the conversion unit 14 extracts the process op in the order of process numbers.

The conversion unit 14 sets the data obtained by applying op on d to d2 (S604). The conversion unit 14 sets d2 to d (S605). When it is determined that total_op is empty ("YES" in S602), the conversion unit 14 outputs d (S606). In S606, the data d output by the conversion unit 14 is post-conversion data. The conversion unit 14 stores the post-conversion data in the post-conversion data storage unit 16 and outputs the post-conversion data to the display control unit 19.

Figure 14:
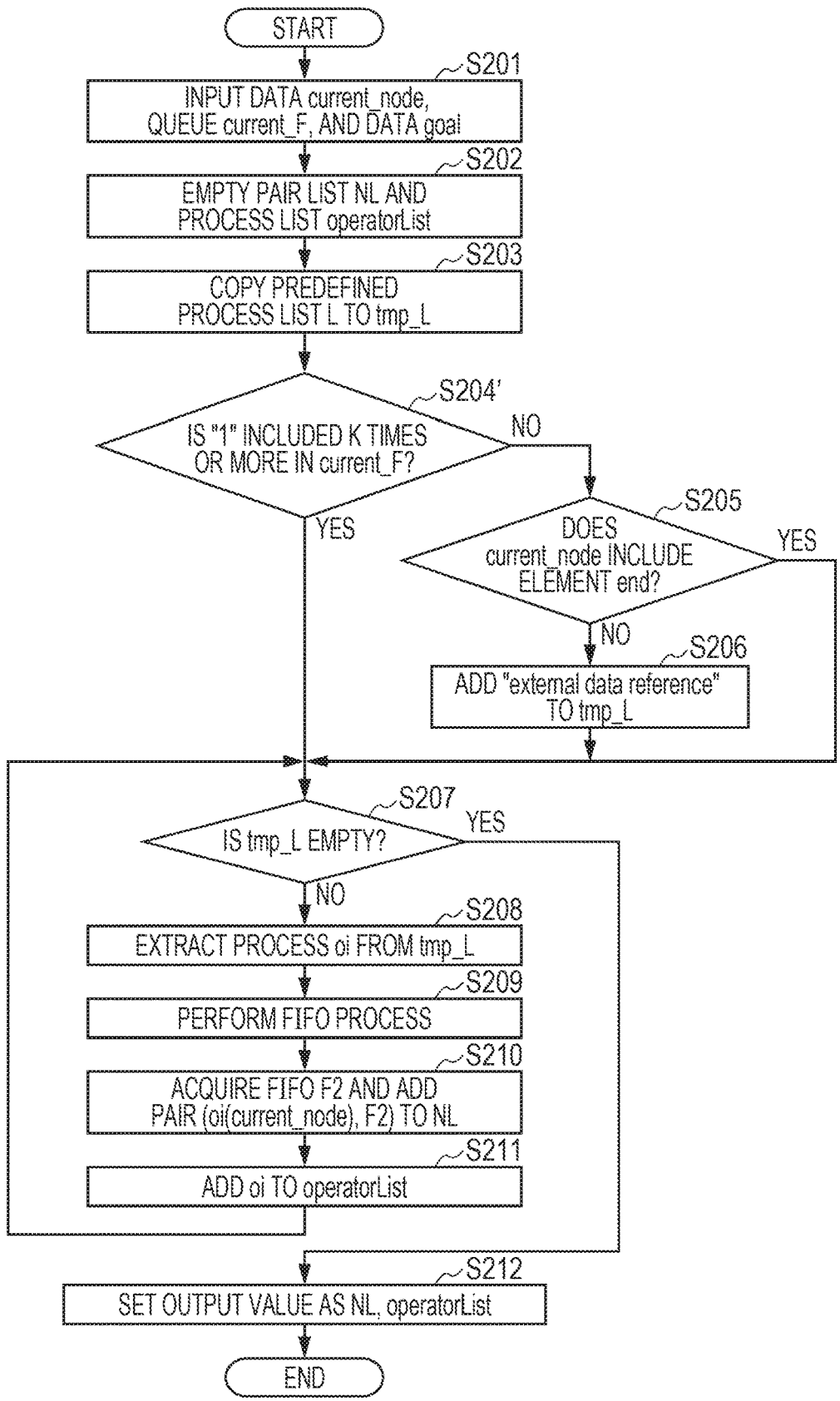
FIG. 14 is a flowchart illustrating a second exemplary process of a neighborFunc function in S113 of FIG. 8B.

FIG. 14 is a flowchart illustrating a second exemplary process of the neighborFunc function in S113 of FIG. 8B. In FIG. 14, S204' is different from S204 of FIG. 9. Processes of FIG. 14 other than S204' are similar to the processes in FIG. 9 other than S204.

In S204', the search unit 12 determines whether "1" is included k times (a second number) or more in current_F. When "1" is included in current_F, it means that a heavy process is included in a predetermined number (a first number) of processes performed immediately before the process applied to the node (current_node) to be searched for. The predetermined number is equal to the number of numerical values stored in the queue.

When "NO" is determined in S204', it is determined whether current_node includes an element end (S205). When "NO" is determined in S205, the search unit 12 adds "external data reference" to tmp_L (S206).

That is, when a heavy process is included less than k times in a predetermined number of processes performed immediately before the previously found process and when the post-conversion data is not included in the search target data, the search unit 12 treats a heavy process as a candidate of a process to be applied to the search target data.

Figure 15:
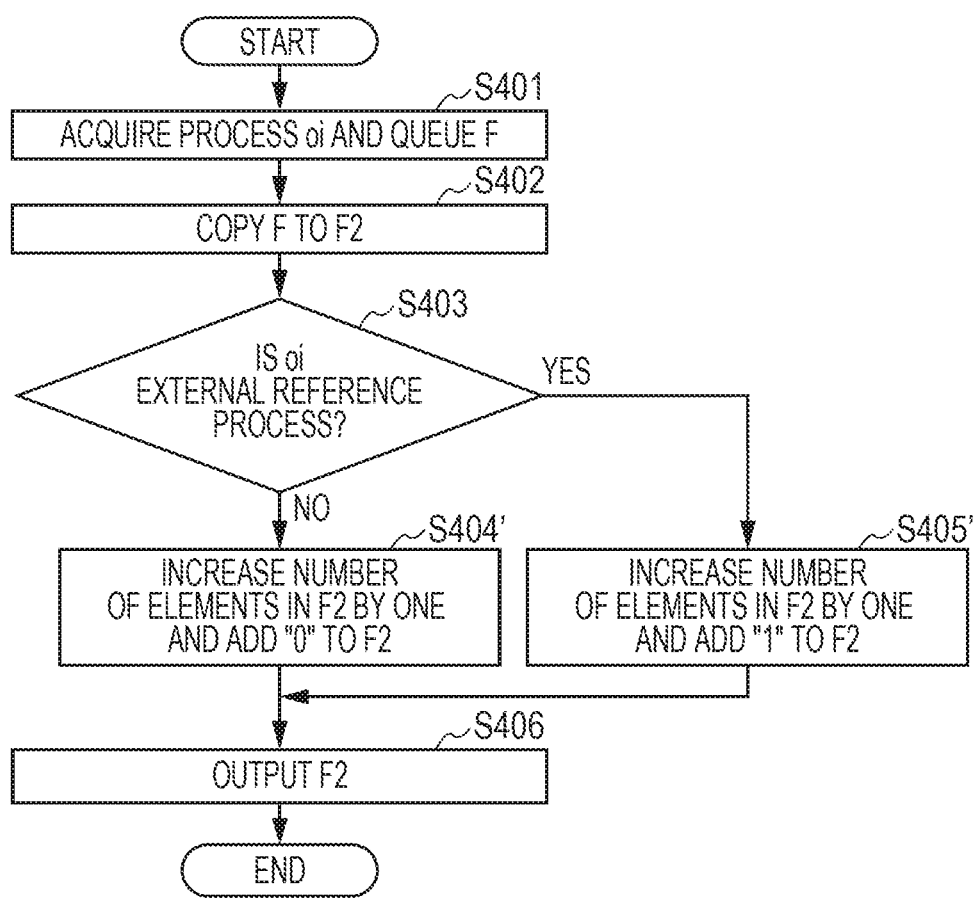
FIG. 15 is a flowchart illustrating a second example of an FIFO process in S209 of FIG. 9.

FIG. 15 is a flowchart illustrating a second example of the FIFO process in S209 of FIG. 9. In FIG. 15, S404' and S405' are different from S404 and S405 of FIG. 11.

In S404', the search unit 12 increases the number of storage elements of F2 by one and adds "0" to F2. In S405', the search unit 12 increases the number of storage elements of F2 by one and adds "1" to F2. In S404' and S405', the search unit 12 does not perform processing for pulling out elements from the queue F2. Therefore, F2 includes all elements already added.

In a case of employing the process illustrated in FIG. 15, in S204 to S206 of FIG. 9, when no heavy process is included in all processes for which search has been performed and when the post-conversion data is not included in the search target data, the search unit 12 treats a heavy process as a candidate of a process to be applied to the search target data. Therefore, in a case of employing the process illustrated in FIG. 15, the data conversion apparatus 1 may reduce heavy processes in all processes used for data search.

Figure 16:
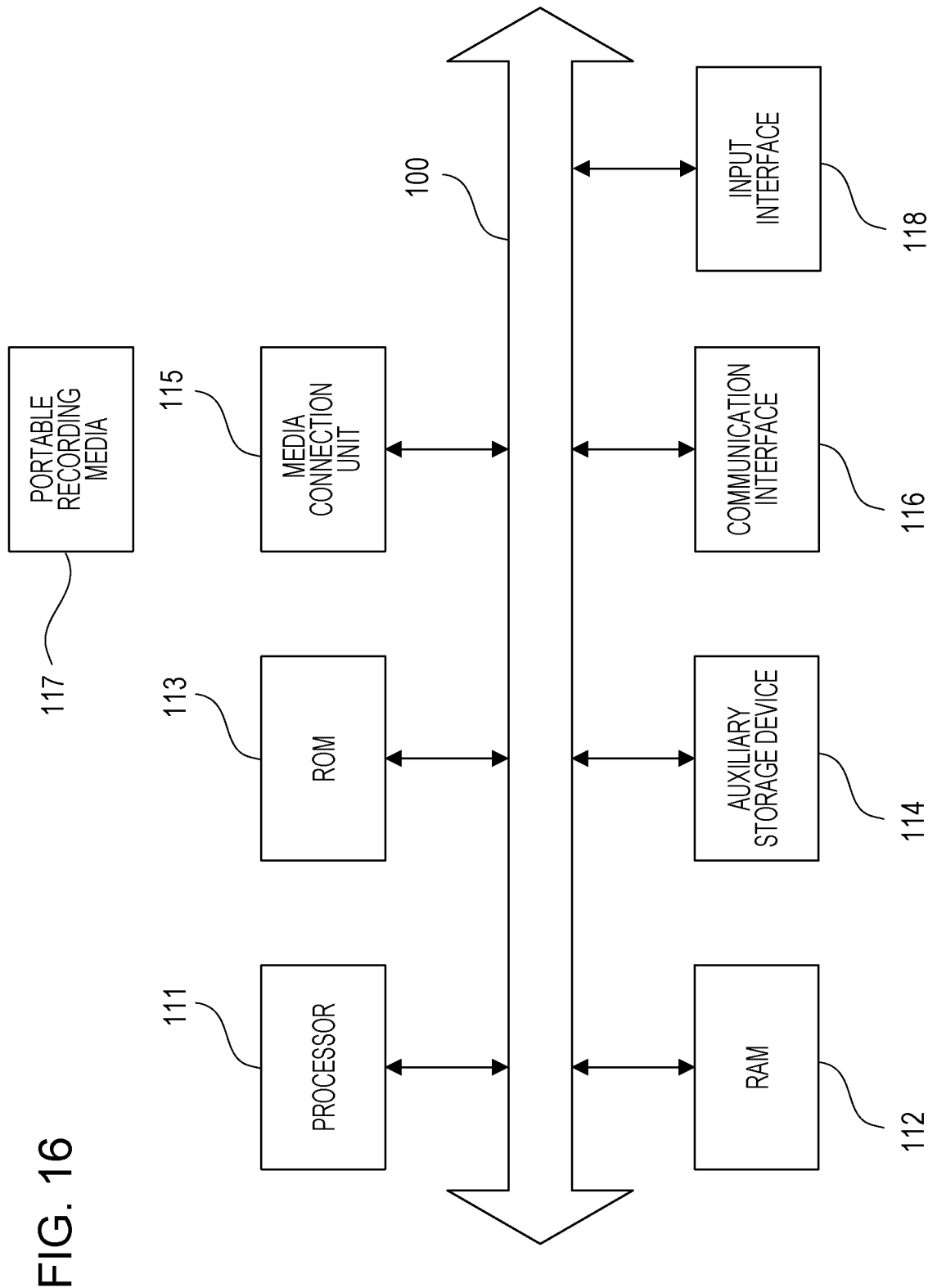
FIG. 16 is a diagram illustrating an exemplary hardware configuration of a data conversion apparatus.

Next, an exemplary hardware configuration of the data conversion apparatus 1 will be described with reference to FIG. 16. As illustrated in FIG. 16, a processor 111, a random access memory (RAM) 112, and a read-only memory (ROM) 113 are coupled to a bus 100. In addition, an auxiliary storage device 114, a media connection unit 115, a communication interface 116, and an input interface 118 are coupled to the bus 100.

The processor 111 executes a program loaded in the RAM 112. As a program to be executed, a data conversion program that performs processes according to the embodiment may be applied.

The ROM 113 is a nonvolatile storage device that stores the program to be loaded into the RAM 112. The auxiliary storage device 114 is a storage device that stores various types of information. For example, a hard disk drive, a semiconductor memory, or the like may be applied. The data conversion program for performing the processes according to the embodiment may be recorded in the auxiliary storage device 114.

The media connection unit 115 is provided so as to be connectable to a portable recording media 117. The portable recording media 117 may include a portable memory or an optical disc (for example, a compact disc (CD) or a digital versatile disc (DVD)), a semiconductor memory, or the like. The data conversion program for performing the processes according to the embodiment may be recorded on the portable recording media 117.

The pre-conversion data storage unit 15, the post-conversion data storage unit 16 and the process information storage unit 17 illustrated in FIG. 2 may be implemented by the RAM 112, the auxiliary storage device 114, or the like. The acquisition unit 11 illustrated in FIG. 2 may be implemented by the communication interface 116 or the input interface 118. The input interface 118 is, for example, a mouse, a keyboard, or a touch panel display. The search unit 12, the FIFO unit 13, the conversion unit 14, the setting unit 18, and the display control unit 19 illustrated in FIG. 2 may be implemented when the processor 111 executes the data conversion program loaded in the RAM 112.

The RAM 112, the ROM 113, the auxiliary storage device 114, and the portable recording media 117 are examples of tangible storage media that may be read by a computer. These tangible storage media are not transitory media such as signal carriers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
acquiring first data stored in a first storage;
acquiring a part of second data, stored in a second storage, corresponding to a part of the first data;
searching for a combination of processes based on an attribute indicating a processing time for performing each process among processes for converting the part of the first data into the part of the second data, the combination of processes being used for converting a remainder of the first data into a remainder of the second data;
searching for the combination of processes in order of performing the processes; and
treating a first process as a candidate of a process to be applied to search target data in a case where the first process is included less than a second number in a first number of processes performed immediately before a previously found process and where the search target data does not include the second data, the first process having an attribute indicating that a processing time of the first process is longer than a predetermined value; and
outputting the combination of processes.

2. The non-transitory computer-readable recording medium according to claim 1, the process further comprising:
converting the remainder of the first data into the remainder of the second data based on the combination of processes.

3. The non-transitory computer-readable recording medium according to claim 1, the process further comprising:
searching for the combination of processes in order of performing the processes; and
treating a first process as a candidate of a process to be applied to search target data in a case where the first process is not included in a first number of processes performed immediately before a previously found process and where the search target data does not include the second data, the first process having an attribute indicating that a processing time of the first process is longer than a predetermined value.

4. The non-transitory computer-readable recording medium according to claim 1, the process further comprising:
searching for the combination of processes in order of performing the processes; and
treating a first process as a candidate of a process to be applied to search target data in a case where the first process is not included in any processes that have been found and where the search target data does not include the second data, the first process having an attribute indicating that a processing time of the first process is longer than a predetermined value.

5. The non-transitory computer-readable recording medium according to claim 1, the process further comprising:
measuring a processing time for each process type; and
setting the attribute based on the measured processing time.

6. The non-transitory computer-readable recording medium according to claim 1, the process further comprising:
measuring a processing time for each process;
calculating an average value of the processing time for each process type;
outputting the average value of the processing time for each process type; and
setting the attribute based on an input by a user.

7. A data conversion method comprising:
acquiring first data, stored in a first storage, by a computer;
acquiring a part of second data, stored in a second storage, corresponding to a part of the first data;
searching for a combination of processes based on an attribute indicating a processing time for performing each process among processes for converting the part of the first data into the part of the second data, the combination of processes being used for converting a remainder of the first data into a remainder of the second data;
searching for the combination of processes in order of performing the processes; and
treating a first process as a candidate of a process to be applied to search target data in a case where the first process is included less than a second number in a first number of processes performed immediately before a previously found process and where the search target data does not include the second data, the first process having an attribute indicating that a processing time of the first process is longer than a predetermined value; and
outputting the combination of processes.

8. A data conversion apparatus comprising:

a memory; and a processor coupled to the memory and the processor configured to:

acquire first data stored in a first storage;

acquire a part of second data, stored in a second storage, corresponding to a part of the first data;

search for a combination of processes based on an attribute indicating a processing time for performing each process among processes for converting the part of the first data into the part of the second data, the combination of processes being used for converting a remainder of the first data into a remainder of the second data;

searching for the combination of processes in order of performing the processes; and treating a first process as a candidate of a process to be applied to search target data in a case where the first process is included less than a second number in a first number of processes performed immediately before a previously found process and where the search target data does not include the second data, the first process having an attribute indicating that a processing time of the first process is longer than a predetermined value; and output the combination of processes.

* * * * *